US008145366B1

(12) United States Patent
Haering, Jr. et al.

(10) Patent No.: US 8,145,366 B1
(45) Date of Patent: Mar. 27, 2012

(54) REAL-TIME, INTERACTIVE SONIC BOOM DISPLAY

(75) Inventors: Edward A. Haering, Jr., Lancaster, CA (US); Kenneth J. Plotkin, Vienna, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 684 days.

(21) Appl. No.: 12/138,747

(22) Filed: Jun. 13, 2008

(51) Int. Cl.
*G06F 19/00* (2011.01)

(52) U.S. Cl. ............... 701/14; 701/3; 701/10; 244/1 N; 702/39

(58) Field of Classification Search .................. None
See application file for complete search history.

(56) References Cited

U.S. PATENT DOCUMENTS

| | | | | |
|---|---|---|---|---|
| 3,655,147 | A * | 4/1972 | Preuss ........................ | 244/1 N |
| 5,023,847 | A * | 6/1991 | Lee ............................ | 367/136 |
| 5,904,724 | A * | 5/1999 | Margolin .................... | 701/120 |
| 6,389,355 | B1 * | 5/2002 | Gibbs et al. ................ | 701/206 |
| 6,905,091 | B2 * | 6/2005 | Berson et al. ............... | 244/1 N |
| 7,121,511 | B2 * | 10/2006 | Kremeyer ................... | 244/130 |
| 7,248,985 | B2 * | 7/2007 | Dwyer et al. ............... | 702/108 |
| 7,581,697 | B1 * | 9/2009 | Hagemeister et al. ..... | 244/117 R |
| 7,599,805 | B2 * | 10/2009 | Pilon .......................... | 702/39 |
| 2001/0023390 | A1 * | 9/2001 | Gia ............................ | 701/301 |
| 2004/0030463 | A1 * | 2/2004 | Stockdale et al. .......... | 701/3 |
| 2005/0098681 | A1 * | 5/2005 | Berson et al. ............... | 244/1 N |
| 2008/0228413 | A1 * | 9/2008 | Pilon .......................... | 702/56 |
| 2010/0017113 | A1 * | 1/2010 | Artini ......................... | 701/202 |
| 2010/0125412 | A1 * | 5/2010 | Suddreth et al. ............ | 701/211 |

OTHER PUBLICATIONS

Extension of PCBoom to Over-The-Top Booms, Ellipsoidal Earth, and Full 3-D Ray Tracing, Plotkin, et al. AIAA/CEAS Aeroacoustics Mtg., May 2007.

* cited by examiner

*Primary Examiner* — Khoi Tran
*Assistant Examiner* — Jonathan L Sample
(74) *Attorney, Agent, or Firm* — Mark Homer

(57) ABSTRACT

The present invention is an improved real-time, interactive sonic boom display for aircraft. By using physical properties obtained via various sensors and databases, the invention determines, in real-time, sonic boom impacts locations and intensities for aircraft traveling at supersonic speeds. The information is provided to a pilot via a display that lists a selectable set of maneuvers available to the pilot to mitigate sonic boom issues. Upon selection of a maneuver, the information as to the result of the maneuver is displayed and the pilot may proceed with making the maneuver, or provide new data to the system in order to calculate a different maneuver.

18 Claims, 7 Drawing Sheets

REAL-TIME, INTERACTIVE SONIC BOOM DISPLAY

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates generally to supersonic aircraft, more particularly to sonic boom impacts generated by supersonic aircraft, and most particularly to real-time, interactive display of sonic boom impacts of supersonic aircraft.

2. Description of the Related Art

As an aircraft travels at supersonic speeds, shock waves propagate from the aircraft toward the ground. Under certain conditions, these shock waves may reach the ground and create loud sounds as well as potential damage to surrounding structures. The locations and intensities of these shock waves are a function of flight trajectory, the type of aircraft, environmental conditions around the aircraft, and the ground terrain.

Due to the potential problems associated with these shock waves, flight over land by civil supersonic aircraft is currently prohibited in the United States and certain prohibitions related to military supersonic aircraft also exist. The Federal Aviation Administration has been studying these problems and has indicated that supersonic flight may be allowed over the United States at some point in the future.

While shock waves and the resulting sonic booms are fundamental to supersonic flight, and, therefore, using current technology, are not possible to eliminate, certain research has been done to help more easily identify the shock wave signature of supersonic flight to help, potentially, avoid the problems noted above associated with supersonic flight over land.

For example, U.S. Pat. No. 6,905,091 discloses a system for controlling the acoustic signature of a supersonic aircraft by receiving operating condition information related to the aircraft, determining the acoustic signature based on those conditions, and providing this information to the aircraft so that if a certain acoustic signature level is reached, the pilot of the aircraft can take actions to reduce the acoustic signature below said level.

However, there are several problems associated with this system as disclosed in the patent. First, the patent does not describe any viable method of actually calculating or obtaining much of the data it purports to display or provide related to the aircraft.

Second, environmental conditions, such as temperature and wind speeds, are critical in calculating the force and direction of shock waves resulting from supersonic aircraft. The above noted system uses imaging sensors such as RADAR, FUR, and video cameras to provide such environmental conditions. Such imaging sensors are insufficient to provide the necessary real-time data to produce a quality shock wave determination. Further, such systems cannot provide any such data on conditions in areas of the planned upcoming route for the aircraft.

Third, the above referenced patent provides for the use of colored lights or similar to indicate to an aircraft pilot that sonic boom issues might be present and that some action may need to be taken in order to mitigate said issues. However, the patented invention does not provide a list of specific maneuvers available to mitigate sonic boom issues or the ability to obtain real-time data as to the result of such maneuvers.

Lastly, the above referenced patent does not provide for the proactive use of sonic booms by the aircraft.

Therefore, it is desired to provide an improved, real-time, interactive sonic boom display for aircraft that possesses the above noted features.

SUMMARY OF THE INVENTION

The invention employs the sonic boom prediction tool called PCBoom a it merges it with to real-time aircraft data feeding a local area moving map display. In its basic mode, the current sonic boom footprint is displayed on the map. For certain lower Mach and higher altitude flight conditions, the shock waves refract upward and never reach the ground, which, herein, will be referred to as the Mach cutoff condition. In this case the display would show the maximum Mach number and/or minimum altitude to prevent shock waves from reaching the ground.

The interactive mode of this display involves the pilot selecting from a menu of preprogrammed maneuvers, such as accelerations, turns, or push overs. The selected maneuver's sonic boom footprint would be shown on the map, and the pilot could accept or modify parameters of that maneuver to place the footprint in the desired location. Certain locations may be "No Boom" zones, while other locations may be an insensitive place to put inevitable acceleration or focus booms, or of military interest for loud booms. After the pilot has accepted a future maneuver, guidance information would be given to the pilot to execute that maneuver.

Accordingly, it is an objective of this invention to provide a real-time sonic boom display for aircraft.

It is another objective of this invention to provide an interactive sonic boom display for aircraft that allows a pilot to select from a menu of maneuvers by seeing results of said maneuvers.

It is a further objective of this invention to provide a sonic boom display for aircraft to allow a pilot to proactively make use of sonic booms.

This invention meets these and other objectives related to vehicle interaction with sonic booms by providing a real-time interactive cockpit display of sonic boom impact locations and to intensities.

In general, the invention comprises an improved real-time, interactive sonic boom display for an aircraft, comprising a processor capable of calculating significant information related to the potential for sonic booms related to the aircraft's operation. The processor calculates the sonic boom near field source based on aircraft flight parameters. The processor then ray traces the sonic boom to a ground location based on the sonic boom near field source, environmental condition data, terrain data, and aircraft information. The processor signature ages the ray trace information to obtain a ground boom footprint and also processes the ray trace information to obtain Mach cutoff condition information. The aircraft information used by the processor is found in a library file, a terrain data system provides the terrain data to the processor, the aircraft system bus provides real-time flight parameters to the processor, and an environmental condition system provides the processor with environmental condition data.

Once all of the data is processed, it is shown visually on a display. In a preferred embodiment of the invention, the display includes a plurality of selectable maneuvers. When a user selects one of these maneuvers, information regarding the results of the maneuvers is displayed to the user and may modify input data to modify and update the maneuver list.

BRIEF DESCRIPTION OF THE DRAWINGS

In the drawings, which are not necessarily to scale, like or corresponding parts are denoted by like or corresponding reference numerals.

DESCRIPTION OF PREFERRED EMBODIMENTS

The present invention is a system and process for providing a real-time, interactive display of sonic boom impact locations and intensities that may be used by a user for a desired effect.

The invention employs a sonic boom prediction tool that uses real-time aircraft and environmental data and feeds the result to a local area moving map display. The current sonic boom footprint is displayed along with Mach cutoff condition information as well as a list of selectable maneuvers which allow a user to make a selection and see the results before actually using the maneuver. After selecting a maneuver from the list, guidance information is given to the user in order to execute the maneuver.

In addition, the system and process allows a user to modify the input data related to the list of maneuvers in order to obtain new or updated maneuver information.

Figure 1:
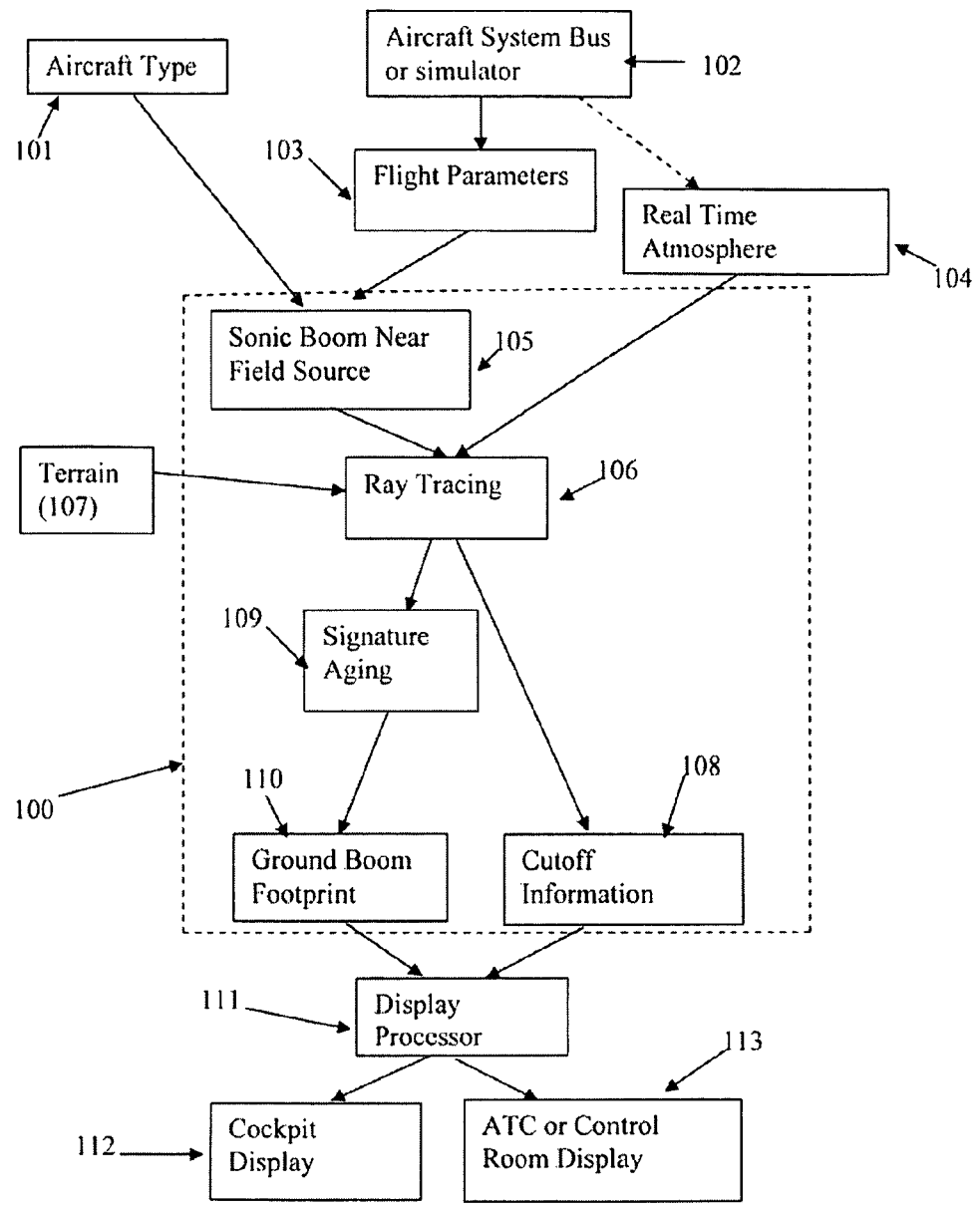
FIG. 1 depicts a flowchart describing the general elements of the present invention.
Figure 2A:
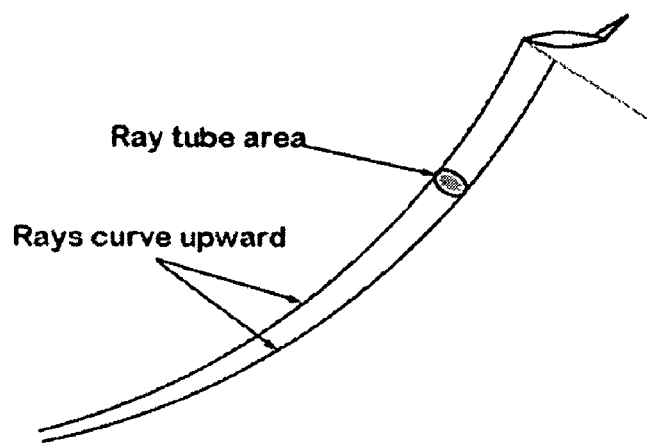
FIG. 2a depicts a sonic boom ray upward curvature.
Figure 2B:
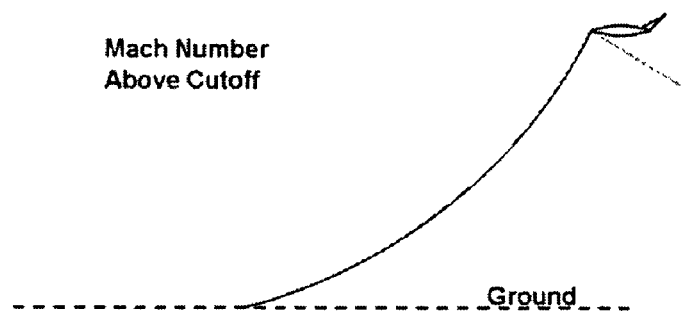
FIG. 2b depicts an aircraft flying above the Mach cutoff condition.
Figure 2C:
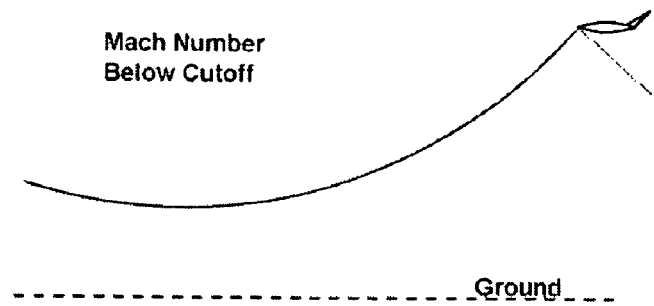
FIG. 2c depicts an aircraft flying below the Mach cutoff condition.
Figure 2D:
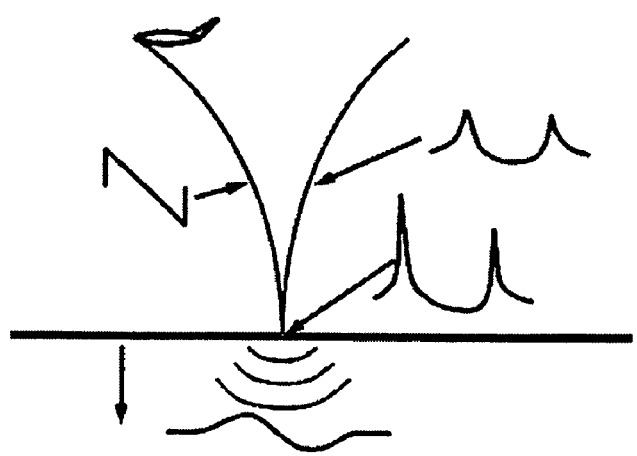
FIG. 2d depicts a close-up around Mach cutoff condition turning altitude, showing a focused superboom region.

Referring to FIGS. 2a-2d, during flight in the Earth's atmosphere, sonic boom rays tend to curve upward, as sketched in FIG. 2a. The boom may reach the ground, depending on whether the flight Mach number is above (FIG. 2b) or below (FIG. 2c) the Mach cutoff condition. The Mach cutoff condition is important for determining not only whether the boom reaches the ground, but its amplitude near the Mach cutoff condition. FIG. 2d is a close up of the boom near the altitude where it turns upward. Above that altitude, there is a normal N-wave boom, possibly trailed by a small secondary boom. Below that altitude there is an "evanescent" boom that decays quickly. At (and near) that altitude, there is a focused "superboom." Operations intended to exploit Mach cutoff conditions must incorporate an adequate margin to avoid superbooms.

The present invention includes calculation of Mach cutoff condition information presented in three basic ways. The first is whether flight at the current altitude and Mach is above or below the Mach cutoff condition. The second is what altitude would correspond to cutoff at the current Mach number. The third is what Mach number would correspond to cutoff at the current altitude. The display includes the margin associated with the size of the superboom region.

Referring to FIGS. 1 and 3a-3c, in general, the present invention comprises a processor 100, that calculates the sonic boom ground footprint 110 and Mach cutoff condition 108 from inputs including aircraft type 101, flight parameters 103, real-time environmental conditions 104 and terrain data 107.

The sonic boom ground footprint 110 and Mach cutoff condition 108 information will be sent to a display processor 111 that allows this information to be interpreted by a display in either an aircraft cockpit 112 and/or a ground-based display 113.

The processor will also calculate a list of potential maneuvers, based on the sonic boom ground footprint 110 and Mach cutoff condition 108, available to a user of the invention (usually a pilot on an aircraft) that are also displayed. A user may select one of the maneuvers and data will be provided to the user on the display 112, 113 indicating the result of executing said maneuver.

Further, the user may also modify the input parameters noted above (101, 103, 104, 107) via the display 112, 113 wherein the processor 100 recalculates and updates the maneuver list displayed.

More specifically, the system operation is described as follows. An aircraft type 101 is specified, preferably from an electronic library of aircraft types that may include lists of known aircraft and aircraft types based on geometry. Aircraft flight parameters (103) are provided in real-time from the aircraft system bus 102. The current environmental conditions (104) are input from data collected by the aircraft during its ascent and/or descent, from separate meteorological measurements, from other aircraft's measurements, or a combination thereof. Finally, terrain data 107 is input, preferably from a digital terrain elevation database to more precisely determine the ground height in relation to the aircraft.

The processor 100, which comprises a sonic boom simulation program, and, most preferably, a version of PCBoom modified to run in conjunction with a moving map display program, uses the above noted input parameters to make the following calculations.

The sonic boom near field source (105) is calculated by one of several methods, depending on the type of aircraft selected from the aircraft type library 101 and using the flight parameters 103 obtained from the aircraft system bus 102. When the aircraft type chosen from a to library of known types, an N-wave F-function is generated by Carlson's method. If a geometric type is selected, the near field source 105 is calculated from area rule methods, following the Whitham-Walkden theory. The processor 100 also includes the capability of using model wind tunnel data or computed CFD flow fields to calculate the sonic boom near field source 105.

Propagation of the sonic boom to the ground is computed by ray tracing (106) using the sonic boom near field source calculation 105, environmental condition data 104, and terrain data 107. Direct integration of the eiconal equation for a soup of rays is employed. This process provides the ray paths, the ray tube areas, and acoustic impedance necessary to compute boom location and amplitude at the ground. Terrain data (107) is used to define the intercept of the boom rays with the local ground.

The ray tracing process also provides Mach cutoff condition information (108). This identifies whether flight conditions are above or below Mach cutoff conditions. The flight altitude for which cutoff would occur for the current Mach number, and the Mach number for which cutoff would occur for the current flight altitude, are computed. These are obtained as a byproduct of the ray tracing process 106.

Signature aging (109) of the output of the ray tracing process 106 accounts for the evolution of the sonic boom due to nonlinear effects. The boom steepens and shocks may form. Aging is governed by Whitham's rule. Four complimentary algorithms are incorporated: direct application of Whitham's far field scaling (as extended by Carlson and Plotkin), Thomas's waveform parameter method, Middleton and Carlson's waveform folding method, and a Burgers solver. The first method (extended Whitham scaling) is applicable for simple N-wave cases. The fourth method (Burgers solver) integrates the Burgers equation along a ray and provides more detailed shock structures than the other methods. The result of the signature aging 109 is the ground boom footprint 110.

The ground boom footprint (including signatures) 110 and Mach cutoff condition information 108 flow into the display processor (111). The display processor organizes these results into isopemps, contours and various loudness and impact metrics. It integrates these results with map data and other pertinent information. The final results, which include the sonic boom locations and intensities are displayed in the cockpit (112) or to controllers on the ground (113) by superimposing the results on a moving map display.

As noted above, the processor 100 preferably is an updated version of the PCBoom sonic boom simulation tool modified to run in conjunction with a moving map display. The simulation tool not only can make the calculations discussed above, but also may calculate the over-the-top sonic boom and three dimensional earth and atmosphere. The moving map display may be selected by one skilled in the art. Preferable moving map display software includes the NASA Dryden Flight Research Center developed Global Real-Time Interactive Map, FalconView, or Satellite ToolKit.

The aircraft flight parameters 103 are obtained from the aircraft system bus 102 via numerous sensors associated with standard aircraft hardware including onboard GPS receivers and aircraft airdata systems. The flight parameters 103 related to the present invention include the aircraft position, altitude, Mach number, flight path heading, flight path angle, and total aircraft weight and load factor.

The environmental condition system 104 provides the air temperature and wind speed and direction profiles to the processor 100. In one embodiment, the environmental condition system 104 include pre-flight weather balloon data and/or traditional balloon upper-air soundings which are available via the internet or other sources. In a more preferred embodiment, the environmental condition system 104 comprises atmospheric temperature and wind profiles obtained by aircraft as it climbs up to its cruising altitude. Differencing the inertial speed components from a GPS with the airmass relative airspeed components yields the winds aloft. The Euler angles of the aircraft and the calibrated angles of attack and sideslip are used to compute the airspeed components. The Mach number and total temperature measured during ascent may be used to determine an ambient temperature profile. These profiles are tabulated and retained for use during the flight.

In the most preferred embodiment of the present invention, environmental condition data 104 is obtained both during ascent and descent of aircraft in the manner described above. This data is shared, preferably via wireless network, with other aircraft in surrounding areas in order to build an environmental condition database for geographical areas that is available to all aircraft in order to provide input into the present invention.

The display 112, 113 provides a library of selectable maneuvers available to the user of the system. The maneuvers can be turns, accelerations, decelerations, descents, or other more exotic maneuvers that combine and/or add to these standard maneuvers. When a user selects a potential maneuver, the processor calculates an "updated" ground sonic boom footprint and depicts it on the moving map display. If the user wants to then implement the maneuver, the user may do so using cues provided on the display.

However, if the user desires to modify the maneuver, the user can adjust the inputs, such as time to execute, turn rate, Gs, etc. The user may also take the sonic boom footprint as calculated and translate the footprint, which will not modify the footprint shape (other than to possibly due to terrain changes).

In one embodiment of the invention, the ground sonic boom footprint and listed maneuvers may be used in order to direct the sonic boom to a specific structure or location on the ground. This feature of the invention may be used to cause damage to a specific structure or location or as a diversionary tactic.

Figure 3A:
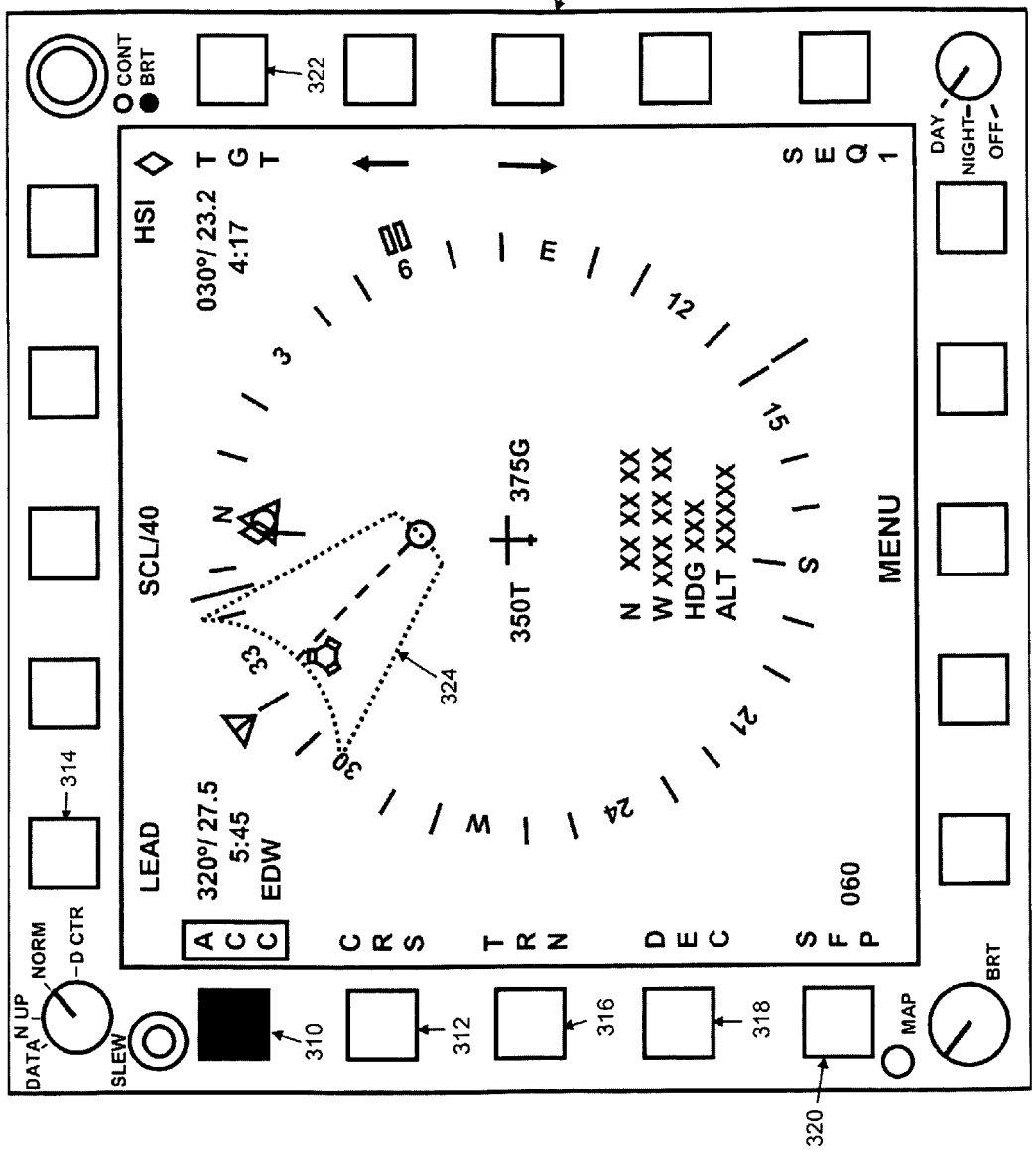
FIG. 3a depicts an embodiment of a display screen showing a specific sonic boom footprint maneuver related to acceleration information.
Figure 3B:
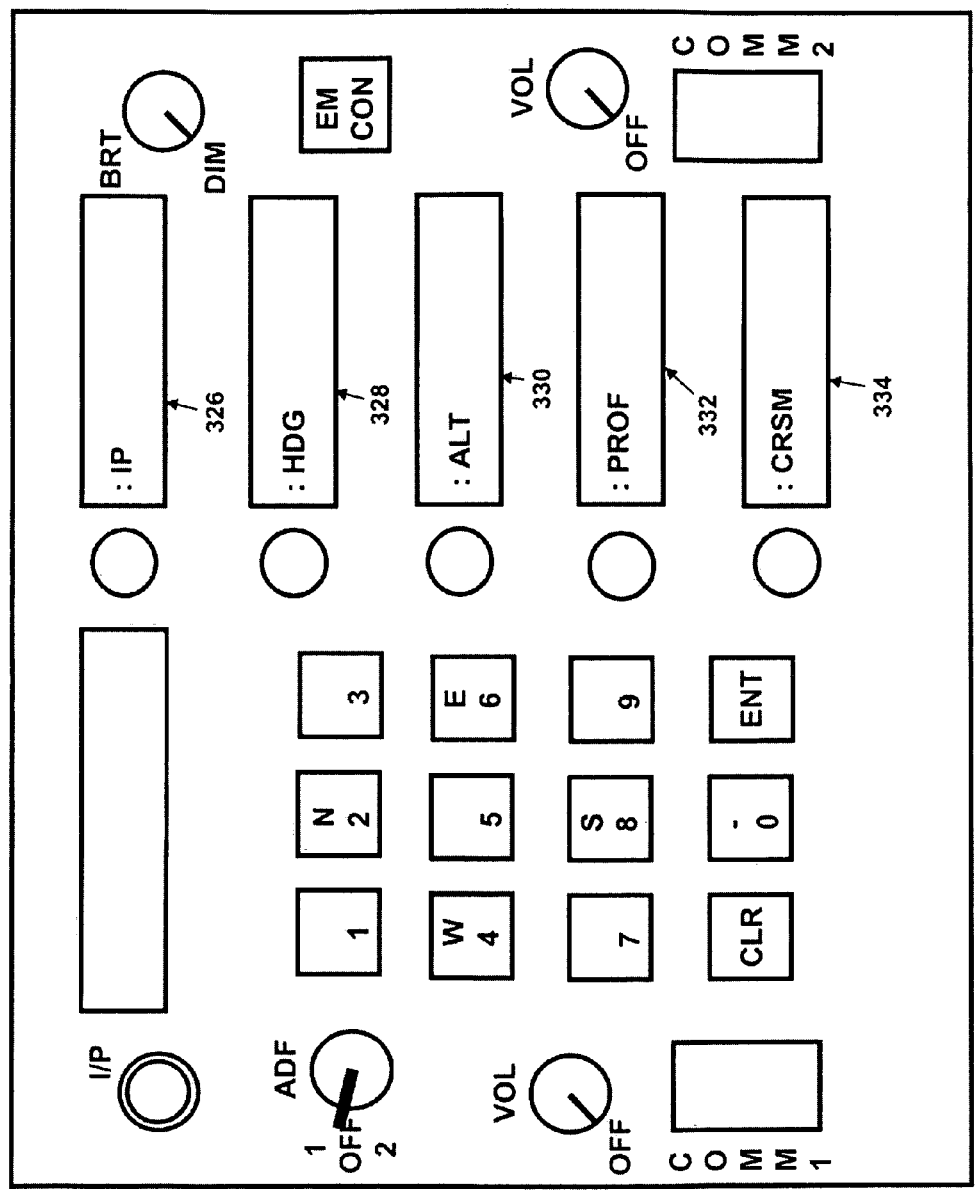
FIG. 3b depicts a secondary information display screen related to modifying sonic boom footprint maneuvers depending upon changes in acceleration data.
Figure 3C:
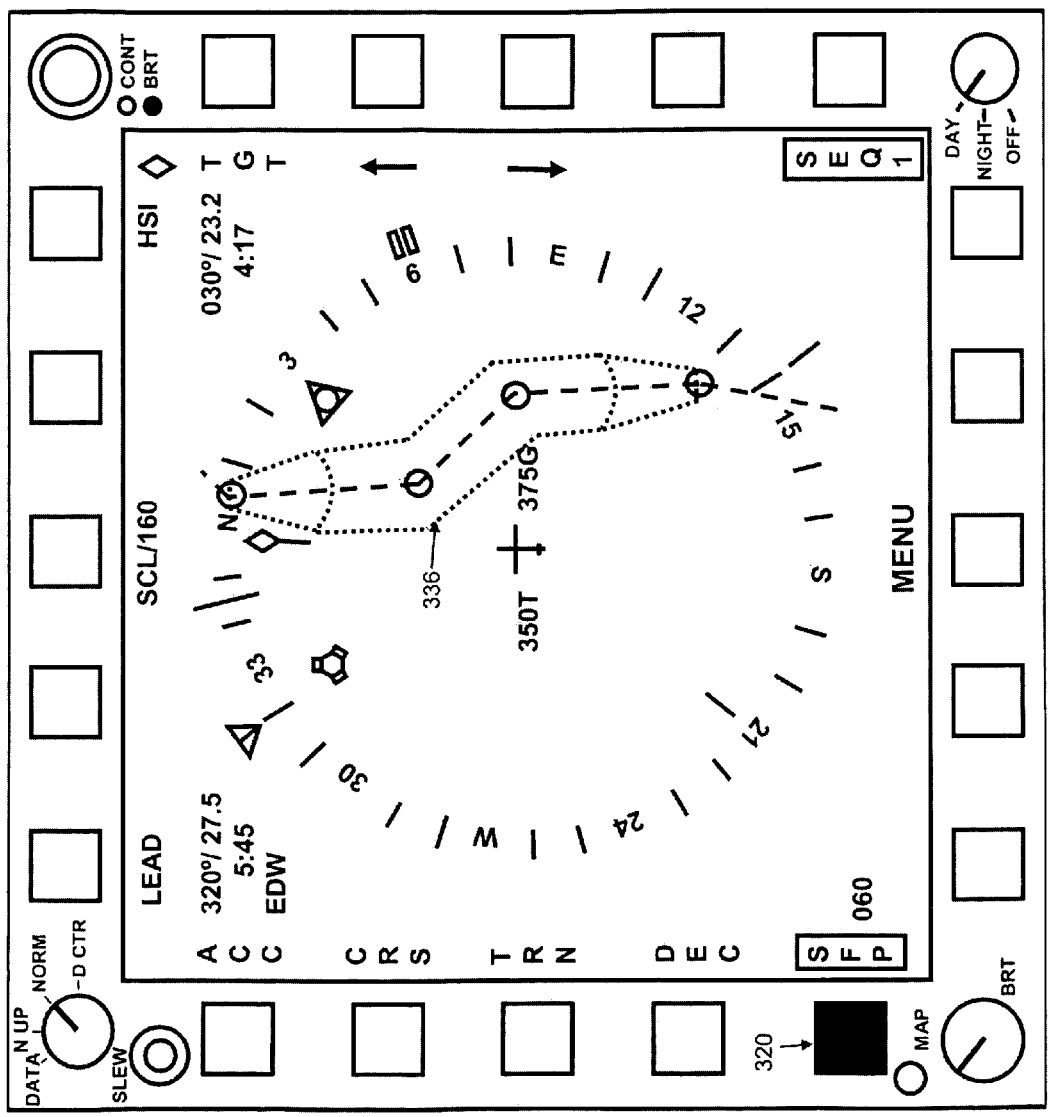
FIG. 3c depicts an embodiment of the display showing a flight plan based on currently selected maneuvers and data.

Referring specifically to FIGS. 3a-3c, FIG. 3a shows an embodiment of a cockpit or control room display 112, 113 that has buttons along the perimeter of the display that relate to functions of the aircraft including acceleration 310, cruise 312, lead 314, turn 316, and deceleration 318, as well as a supersonic flight plan button 320 and a target button 322.

FIG. 3a shows that the acceleration button 310 has been selected and the display shows the sonic boom footprint 324 anticipated based on the aircrafts current acceleration data. FIG. 3b depicts a secondary data screen that may come up when the acceleration button 310 from FIG. 3a is selected. This secondary data screen includes acceleration related data input including the initial point (where the acceleration will start) 326, heading 328, altitude 330, acceleration profile 332, and desired cruise mach at the end of the acceleration 334. The secondary data screen allows a user to modify any of these data points in order to create a new sonic boom footprint 324 related to acceleration.

Each of the remaining aircraft button functions (cruise 312, lead 314, turn 316, and deceleration 318), has a similar secondary data screen which allows a user to modify the data related to each function in order to modify the sonic boom footprint as it relates to said function.

FIG. 3c, depicts selection of the supersonic flight plan button 320, which compiles information from all of the other secondary function data screens and provides an overall display of the suggested flight plan 336 as it relates to the aircraft's sonic boom. This overall flight plan will be modified when the user modifies data on any of the secondary data screens as described above.

Finally, the target button 322 may be selected to provide a display of the sonic boom footprint at a selected location. The secondary data screen related to the target button includes data such as the target point, elevation, heading, mach number, and altitude of the aircraft. This screen can be used to show how the sonic boom of the aircraft may be used to direct the boom to a particular point on the ground as described previously herein.

Figure 4:
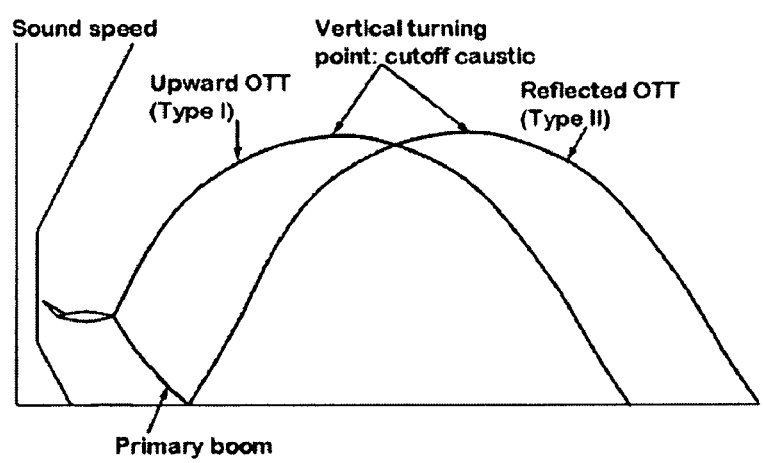
FIG. 4 depicts over the top sonic boom paths created by supersonic aircraft.

Referring to FIG. 4, two aspects of sonic boom which are still the subject of research are the effects of atmospheric conditions on sonic boom variability, and the propagation of "over the top" booms.

Automatic boom monitors have been deployed for extended periods as part of research projects, and sonic military ranges have permanent monitors. It is anticipated that civil supersonic flight will be accompanied by permanent monitors at key locations, analogous to the permanent noise monitoring systems around airports.

Over the top sonic booms, illustrated in FIG. 4, have been used as probes of the properties of the upper atmosphere. This type of measurement has been difficult because upper atmosphere conditions are generally not known as well as the atmosphere below the aircraft, so coordination of measurement locations and experimental flight tests can be problematic. Curvature of the Earth is also an issue for the long ranges involved in over the top booms. The present invention includes sonic boom propagation algorithms for over the top booms and the effect of the curvature of the Earth's. Coordinated with automatic ground boom monitors, and the ability of aircrews to adjust flight conditions in real time, the present invention will enable efficient sonic boom probing of the upper atmosphere.

What is described are specific examples of many possible variations on the same invention and are not intended in a limiting sense. The claimed invention can be practiced using other variations not specifically described above.

What is claimed is:

1. An improved real-time, interactive sonic boom display for an aircraft, comprising:
    a processor configured to calculate a sonic boom near field source based on aircraft flight parameters, ray tracing the sonic boom to a ground location based on the sonic boom near field source, terrain data, aircraft information, and environmental condition data, signature aging the sonic boom due to nonlinear effects based on the ray tracing, and calculating a boom footprint and Mach cutoff condition based on the signature aging and ray tracing;
    a library file to provide the processor aircraft vehicle information;
    a terrain data system to provide the processor terrain data;
    an aircraft system bus to provide the processor with real-time flight parameters;
    an environmental condition system that provides environmental conditions from ground locations to and around the aircraft to the processor; and,
    a display to visually show information from the processor.

2. The improved real-time, interactive sonic boom display for an aircraft of claim 1, wherein the processor is further capable of calculating a plurality of maneuvers available to a user, the results of the maneuvers related to the sonic boom, and providing these maneuvers as a list to the display, selectable by the user.

3. The improved real-time, interactive sonic boom display for an aircraft of claim 2, wherein the user can modify input parameters via the display to the processor to provide an updated maneuver list on the display.

4. The improved real-time, interactive sonic boom display for an aircraft of claim 1, wherein the environmental condition system comprises atmospheric data obtained by the aircraft as the aircraft climbs to cruise altitude.

5. The improved, real-time, interactive sonic boom display for an aircraft of claim 4, wherein the environmental condition system further comprises atmospheric data obtained by the aircraft during descent from cruise altitude.

6. The improved, real-time, interactive sonic boom display for an aircraft of claim 5, wherein the environmental condition system further comprises data obtained via a network having input from other aircraft as the other aircraft climb and descend from their cruising altitudes.

7. The improved, real-time, interactive sonic boom display for an aircraft of claim 2, wherein at least one of the selectable maneuvers comprises directing the sonic boom to a specific ground location.

8. The improved real-time, interactive sonic boom display for an aircraft of claim 7, wherein the at least one selectable maneuver comprises a sufficient sonic boom to cause damage to the specific ground location.

9. A process for providing real-time, interactive sonic boom data for use of an aircraft, comprising the steps of
    providing an aircraft type;
    providing real-time flight parameters using the aircraft system bus;
    providing a processor configured to calculate the sonic boom near field source using the aircraft type and real-time flight parameters;
    providing atmospheric conditions and terrain data;
    computing propagation of the sonic boom to the ground by ray tracing using the sonic boom near field source, the atmospheric conditions, and the terrain data;
    signature aging the propagation data for the evolution of the sonic boom due to nonlinear effects to obtain a ground boom footprint;
    calculating Mach cutoff conditions using the propagation data; and,
    visually displaying the ground boom footprint and Mach cutoff conditions.

10. The process for providing real-time, interactive sonic boom data for use of an aircraft of claim 9, further comprising the step of visually displaying selectable maneuvers available to a user to modify the ground boom footprint or Mach cutoff conditions.

11. The process for providing real-time, interactive sonic boom data for use of an aircraft of claim 10, wherein the user may modify input parameters via the display to obtain updated selectable maneuvers.

12. The process for providing real-time, interactive sonic boom data for use of an aircraft of claim 10, wherein the providing atmospheric conditions step comprises the aircraft creating an atmospheric profile during ascent to an aircraft cruising altitude.

13. The process for providing real-time, interactive sonic boom data for use of an aircraft of claim 12, wherein the providing atmospheric conditions step further comprises the atmospheric profile including data obtained by aircraft during decent from the aircraft cruising altitude.

14. The process for providing real-time, interactive sonic boom data for use of an aircraft of claim 13, wherein the providing atmospheric conditions step further comprises the atmospheric profile including data obtained via a network from other aircraft.

15. The process for providing real-time, interactive sonic boom data for use of an aircraft of claim 10, wherein at least one selectable maneuver comprises directing the sonic boom to a ground location.

16. The process for providing real-time, interactive sonic boom data for use of an aircraft of claim 15, wherein directing the sonic boom to the ground location causes damage to the ground location.

17. The process for providing real-time, interactive sonic boom data for use of an aircraft of claim 9, wherein the providing terrain data step comprises use of a digital terrain elevation database.

18. The process for providing real-time, interactive sonic boom data for use of an aircraft of claim 9, wherein the processor calculates the propagation of over the top sonic boom footprints.

* * * * *